United States Patent
Won et al.

(10) Patent No.: US 12,258,447 B2
(45) Date of Patent: Mar. 25, 2025

(54) POLYIMIDE FILM, METHOD FOR PRODUCING SAME, AND FLEXIBLE METAL FOIL CLAD LAMINATE COMPRISING SAME

(71) Applicant: PI Advanced Materials Co., Ltd., Chungcheongbuk (KR)

(72) Inventors: Dong Young Won, Chungcheongbuk (KR); Dong Young Kim, Chungcheongbuk (KR)

(73) Assignee: PI Advanced Materials Co., Ltd., Jincheon-gun (KR)

( * ) Notice: Subject to any disclaimer, the term of this patent is extended or adjusted under 35 U.S.C. 154(b) by 230 days.

(21) Appl. No.: 17/780,373

(22) PCT Filed: Apr. 23, 2020

(86) PCT No.: PCT/KR2020/005389
§ 371 (c)(1),
(2) Date: May 26, 2022

(87) PCT Pub. No.: WO2021/107294
PCT Pub. Date: Jun. 3, 2021

(65) Prior Publication Data
US 2023/0049631 A1   Feb. 16, 2023

(30) Foreign Application Priority Data
Nov. 29, 2019   (KR) .................. 10-2019-0157572

(51) Int. Cl.
*C08G 73/10*   (2006.01)
*B32B 15/08*   (2006.01)
*B32B 27/28*   (2006.01)

(52) U.S. Cl.
CPC .......... *C08G 73/1067* (2013.01); *B32B 15/08* (2013.01); *B32B 27/281* (2013.01); *B32B 2250/40* (2013.01); *B32B 2307/308* (2013.01)

(58) Field of Classification Search
None
See application file for complete search history.

(56) References Cited

U.S. PATENT DOCUMENTS

| | | | |
|---|---|---|---|
| 2004/0058172 A1* | 3/2004 | Summers | C08G 73/1071 428/473.5 |
| 2008/0044684 A1* | 2/2008 | Chan | C08L 79/08 428/626 |
| 2012/0231257 A1* | 9/2012 | Dunbar | C08G 73/1042 428/220 |

FOREIGN PATENT DOCUMENTS

| | | | | |
|---|---|---|---|---|
| JP | 2004068002 | | 3/2004 | |
| JP | 2007162005 | | 6/2007 | |
| JP | 2019073659 A | * | 5/2019 | ............ B32B 15/08 |
| JP | 2019151748 | | 9/2019 | |
| JP | 2019151748 A | * | 9/2019 | ............ B32B 15/08 |
| KR | 100656246 | | 12/2006 | |
| KR | 20150037574 | | 4/2015 | |
| KR | 102004660 | | 7/2019 | |
| KR | 20190116724 | | 10/2019 | |
| KR | 20190130526 | | 11/2019 | |
| TW | 200734383 | | 9/2007 | |
| TW | 201936737 | | 9/2019 | |

OTHER PUBLICATIONS

Ikeda—JP 2019-151748 A—Jap.Rej. D2-MT-polyimide film—Sep. 12, 2019 (Year: 2019).*
Ogura—JP 2019-073659 A—MT-polyimide film—May 2019 (Year: 2019).*
International Search Report and Written Opinion from related PCT Application No. PCT/KR2020/005389, dated Aug. 26, 2020, 10 pages.

* cited by examiner

*Primary Examiner* — John Vincent Lawler
(74) *Attorney, Agent, or Firm* — Brooks, Cameron & Huebsch, PLLC

(57) ABSTRACT

A polyimide film, a method of manufacturing the same, and a flexible metal foil clad laminate including the same. The polyimide film includes: a first imide bond unit having a glass transition temperature of 400° C. or higher; and a second imide bond unit having a glass transition temperature of less than 400° C., wherein the first imide bond unit is present in an amount of about 39 mol % to about 90 mol % in the polyimide film.

4 Claims, No Drawings

POLYIMIDE FILM, METHOD FOR PRODUCING SAME, AND FLEXIBLE METAL FOIL CLAD LAMINATE COMPRISING SAME

TECHNICAL FIELD

The present invention relates to a polyimide film, a method of manufacturing the same, and a flexible metal foil-clad laminate including the same, and, more particularly, to a polyimide film which have good thermal properties in terms of glass transition temperature, coefficient of thermal expansion, and the like, a method of manufacturing the same, and a flexible metal foil-clad laminate including the same.

BACKGROUND ART

Polyimide films have good mechanical and thermal dimensional stability and chemical stability and are widely used in the fields of materials for electrical/electronic products, aerospace engineering, telecommunications, and the like. Polyimide films are often used as materials for flexible circuit boards which have a fine pattern due to reduction in weight, thickness, length, and size of parts, for example, as base films of tape-automated bonding (TAB) packages or chip-on-film (COF) packages. A flexible circuit board generally has a structure in which a circuit including a metal foil is formed on a base film, and is called "flexible metal foil-clad laminate" in a broad sense. Every processing process using TAB or COF includes a high-temperature process. For example, a chip bonding process, which is a processing process using COF, is performed at a temperature of 380° C. or higher. If the polyimide film used as the base film in this process has a low glass transition temperature, separation of a circuit from the polyimide film is likely to occur during the process.

The background technique of the present invention is disclosed in Korean Patent Registration No. 10-0656246.

DISCLOSURE

Technical Problem

It is one object of the present invention to provide a polyimide film which has good thermal properties in terms of glass transition temperature and coefficient of thermal expansion.

It is another object of the present invention to provide a method of manufacturing the polyimide film set forth above.

It is a further object of the present invention to provide a flexible metal foil-clad laminate including the polyimide film set forth above.

Technical Solution

1. In accordance with one aspect of the present invention, a polyimide film is provided. The polyimide film includes: a first imide bond unit having a glass transition temperature of 400° C. or higher; and a second imide bond unit having a glass transition temperature of less than 400° C., wherein the first imide bond unit is present in an amount of about 39 mol % to about 90 mol % in the polyimide film.
2. In embodiment 1, the first imide bond unit may be derived from a first dianhydride monomer, wherein the dianhydride monomer may include pyromellitic dianhydride (PMDA).
3. In embodiment 1 or 2, the second imide bond unit may be derived from a second dianhydride monomer, wherein the second dianhydride monomer may include 3,3',4,4'-biphenyltetracarboxylic dianhydride (BPDA), 3,3',4,4'-benzophenonetetracarboxylic dianhydride (BTDA), oxydiphthalic dianhydride (ODPA), or a combination thereof.
4. In any one of embodiments 1 to 3, the first imide bond unit may be derived from coupling between a first dianhydride monomer and a diamine monomer and the second imide bond unit may be derived from coupling between a second dianhydride monomer and a diamine monomer, wherein the diamine monomers may each include p-phenylenediamine (PPD), 4,4'-oxydianiline (ODA), m-tolidine, or a combination thereof.
5. In any one of embodiments 1 to 4, the second imide bond unit may have a glass transition temperature of about 300° C. to less than 400° C.
6. In any one of embodiments 1 to 5, the polyimide film may have a glass transition temperature of 370° C. or higher.
7. In any one of embodiments 1 to 6, the polyimide film may have a coefficient of thermal expansion of 8 ppm/° C. or less, as calculated by averaging coefficients of thermal expansion in a machine direction (MD) and in a transverse direction (TD).
8. In accordance with another aspect of the present invention, a method of manufacturing a polyimide film is provided. The method includes: preparing a solution of a polyamic acid by mixing a second dianhydride monomer with a diamine monomer in a solvent to form a second amic acid bond unit through reaction therebetween, followed by adding a first dianhydride monomer and a diamine monomer to form a first amic acid bond unit through reaction therebetween; and imidizing the polyamic acid, wherein the second amic acid bond unit forms a second imide bond unit having a glass transition temperature of less than 400° C. through imidization, the first amic acid bond unit forms a first imide bond unit having a glass transition temperature of 400° C. or higher through imidization, and the polyimide film includes about 39 mol % to about 90 mol % of the first imide bond unit.
9. In embodiment 8, the first dianhydride monomer may include pyromellitic dianhydride (PMDA), the second dianhydride monomer may include 3,3',4,4'-biphenyltetracarboxylic dianhydride (BPDA), 3,3',4,4'-benzophenonetetracarboxylic dianhydride (BTDA), oxydiphthalic dianhydride (ODPA), or a combination thereof, and the diamine monomers may each include p-phenylenediamine (PPD), 4,4'-oxydianiline (ODA), m-tolidine, or a combination thereof.
10. In embodiment 8 or 9, the second imide bond unit may have a glass transition temperature of about 300° C. to less than 400° C.
11. In any one of embodiments 8 to 10, a ratio of the total number of moles of the first dianhydride monomer and the second dianhydride monomer to the total number of moles of the diamine monomers may range from about 1:0.95 to about 0.95:1.
12. In accordance with a further aspect of the present invention, a flexible metal foil-clad laminate is provided. The flexible metal foil clad laminate includes: the polyimide film according to any one of embodiments 1 to 7 or the polyimide film manufactured by the method according to any one of embodiments 8 to 11; and a metal foil formed on the polyimide film.

Advantageous Effects

The present invention provides a polyimide film which has good thermal properties in terms of glass transition temperature and coefficient of thermal expansion, a method of manufacturing the same, and a flexible metal foil-clad laminate including the same.

BEST MODE

Description of known functions and constructions which may unnecessarily obscure the subject matter of the present invention will be omitted.

It will be further understood that the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. As used herein, the singular forms "a," "an," and "the" are intended to include the plural forms as well, unless the context clearly indicates otherwise.

Further, a numerical value related to a certain component is construed to include a tolerance range in interpretation of components, unless clearly stated otherwise.

It will be understood that, although the terms "first", "second", and the like may be used herein to describe various elements, components, regions, layers and/or sections, these elements, components, regions, layers and/or sections should not be limited by these terms. These terms are only used to distinguish one element, component, region, layer or section from another element, component, region, layer or section.

As used herein to represent a specific numerical range, the expression "a to b" means "≥a and ≤b".

As used herein, the term "first imide bond unit" may refer to a unit that is derived from a first dianhydride monomer and is formed by directly coupling the first dianhydride monomer to a diamine monomer, and the term "second imide bond unit" may refer to a unit that is derived from a second dianhydride monomer and is formed by directly coupling the second dianhydride monomer to a diamine monomer.

As used herein, the term "first amic acid bond unit" may refer to a unit that forms a first imide bond unit through imidization, and the term "second amic acid bond unit" may refer to a unit that forms a second imide bond unit through imidization.

As used herein, "glass transition temperature of the first imide bond unit" may mean a glass transition temperature of a polyimide including only a first dianhydride monomer and a diamine monomer, which constitute a first imide bond unit, and "glass transition temperature of the second imide bond unit" may mean thea glass transition temperature of a polyimide including only a second dianhydride monomer and a diamine monomer, which constitute a second imide bond unit.

As used herein, "mol % of a first imide bond unit" may be calculated in consideration of the number of moles of monomers used and the order of introducing the monomers into a reactor. For example, when polyimide is prepared through a procedure in which A mol of a second dianhydride monomer is mixed and reacted with B mol of a diamine monomer and then C mol of a first dianhydride monomer and D mol of a diamine monomer is added and reacted to form a polyamic acid, followed by imidization of the polyamic acid, the mol % of the first imide bond unit may be calculated as follows: $(A+B+C+D)-(2\times A)\}/(A+B+C+D)$.

Polyimide Film

In accordance with one aspect of the present invention, a polyimide film is provided.

The inventors of the present invention completed the present invention based on confirmation that a polyimide film including about 39 mol % to about 90 mol % of an imide bond unit having a glass transition temperature of 400° C. or higher (hereinafter referred to as a "first imide bond unit") based on the total number of moles of imide bond units of the polyimide film has good thermal properties (in terms of, for example, a glass transition temperature, a coefficient of thermal expansion, and the like). In particular, such a polyimide film can have suitable thermal properties for use in flexible metal foil-clad laminates.

The first imide bond unit may be derived from a first dianhydride monomer, specifically from coupling between the first dianhydride monomer and a diamine monomer, wherein the first dianhydride monomer may include any dianhydride monomer that can form the first imide bond unit having a glass transition temperature of 400° C. or higher when coupled to a diamine monomer. For example, the first dianhydride monomer may include pyromellitic dianhydride (PMDA) and the diamine monomer may include p-phenylenediamine (PPD), 4,4'-oxydianiline (ODA), m-tolidine, or a combination thereof.

In one embodiment, the first imide bond unit may include a PMDA-PPD bond unit and/or a PMDA-ODA bond unit. In this way, the polyimide film can have a high glass transition temperature and a desired coefficient of thermal expansion.

The first imide bond unit may have a glass transition temperature of 400° C. or higher. Within this range, the polyimide film can have good thermal properties in terms of glass transition temperature and coefficient of thermal expansion. For example, the first imide bond unit may have a glass transition temperature of 400° C. to about 430° C. (for example, 400° C., about 405° C., about 410° C., about 415° C., about 420° C., about 425° C., or about 430° C.), without being limited thereto.

The first imide bond unit may be present in an amount of about 39 mol % to about 90 mol % (for example, about 39 mol %, about 40 mol %, about 41 mol %, about 42 mol %, about 43 mol %, about 44 mol %, about 45 mol %, about 46 mol %, about 47 mol %, about 48 mol %, about 49 mol %, about 50 mol %, about 51 mol %, about 52 mol %, about 53 mol %, about 54 mol %, about 55 mol %, about 56 mol %, about 57 mol %, about 58 mol %, about 59 mol %, about 60 mol %, about 61 mol %, about 62 mol %, about 63 mol %, about 64 mol %, about 65 mol %, about 66 mol %, about 67 mol %, about 68 mol %, about 69 mol %, about 70 mol %, about 71 mol %, about 72 mol %, about 73 mol %, about 74 mol %, about 75 mol %, about 76 mol %, about 77 mol %, about 78 mol %, about 79 mol %, about 80 mol %, about 81 mol %, about 82 mol %, about 83 mol %, about 84 mol %, about 85 mol %, about 86 mol %, about 87 mol %, about 88 mol %, about 89 mol %, or about 90 mol %) in the polyimide film. If the amount of the first imide bond unit is less than about 39 mol %, it can be difficult to manufacture a polyimide film having desired thermal properties, whereas, if the amount of the first imide bond unit exceeds about 90 mol %, the polyimide film is excessively brittle, and thus can crack during manufacture thereof. For example, the first imide bond unit may be present in an amount of about 40 mol % to about 90 mol %, for another example, about 50 mol % to about 90 mol %, for a further example, about 60 mol % to about 90 mol %, for yet another example, about 70 mol % to about 90 mol %, for yet another example, about 80 mol % to about 90 mol %, for yet another example, about 50 mol % to about 80 mol %, for yet another example, about 60 mol % to about 70 mol %, in the polyimide film, without being limited thereto.

A second imide bond unit having a glass transition temperature of less than 400° C. may be derived from a second dianhydride monomer, specifically from coupling between the second dianhydride monomer and a diamine monomer. The second imide bond unit imparts desired physical properties to the polyimide film without adversely affecting thermal properties of the polyimide film, such as glass transition temperature and coefficient of thermal expansion. For example, the second imide bond unit can improve chemical resistance of the polyimide film or can prevent the polyimide film from being excessively brittle. In use of the second dianhydride monomer and the diamine monomer, the types of second dianhydride monomer and diamine monomer may depend on desired physical properties of the polyimide film. For example, the second dianhydride monomer may include 3,3',4,4'-biphenyltetracarboxylic dianhydride (BPDA), 3,3',4,4'-benzophenonetetracarboxylic dianhydride (BTDA), oxydiphthalic anhydride (ODPA), or a combination thereof, and the diamine monomer may include p-phenylenediamine (PPD), 4,4'-oxydianiline (ODA), m-tolidine, or a combination thereof. In this way, the second imide bond unit can reduce the degree of brittleness of the polyimide film without adversely affecting thermal properties of the polyimide film, such as glass transition temperature and coefficient of thermal expansion.

In one embodiment, the second imide bond unit may have a glass transition temperature of about 300° C. to less than 400° C. (for example, about 300° C., about 310° C., about 320° C., about 330° C., about 340° C., about 350° C., about 360° C., about 370° C., about 380° C., about 390° C., or about 399° C.). Within this range, the polyimide film can have good thermal properties in terms of glass transition temperature and coefficient of thermal expansion.

In one embodiment, the second imide bond unit may be free from a BPDA-ODA bond unit. Since the BPDA-ODA bond unit has a low glass transition temperature of less than about 300° C. and a high coefficient of thermal expansion, as calculated by averaging the values of coefficient of thermal expansion in the MD and TD, the second imide bond unit free from the BPDA-ODA bond unit can further improve thermal properties of the polyimide film, such as glass transition temperature and coefficient of thermal expansion.

In one embodiment, the second imide bond unit may be present in an amount of about 10 mol % to about 61 mol % (for example, about 10 mol %, about 11 mol %, about 12 mol %, about 13 mol %, about 14 mol %, about 15 mol %, about 16 mol %, about 17 mol %, about 18 mol %, about 19 mol %, about 20 mol %, about 21 mol %, about 22 mol %, about 23 mol %, about 24 mol %, about 25 mol %, about 26 mol %, about 27 mol %, about 28 mol %, about 29 mol %, about 30 mol %, about 31 mol %, about 32 mol %, about 33 mol %, about 34 mol %, about 35 mol %, about 36 mol %, about 37 mol %, about 38 mol %, about 39 mol %, about 40 mol %, about 41 mol %, about 42 mol %, about 43 mol %, about 44 mol %, about 45 mol %, about 46 mol %, about 47 mol %, about 48 mol %, about 49 mol %, about 50 mol %, about 51 mol %, about 52 mol %, about 53 mol %, about 54 mol %, about 55 mol %, about 56 mol %, about 57 mol %, about 58 mol %, about 59 mol %, about 60 mol %, or about 61 mol %) in the polyimide film. Within this range, the second imide bond unit can impart desired physical properties to the polyimide film without adversely affecting thermal properties of the polyimide film, such as glass transition temperature and coefficient of thermal expansion.

In one embodiment, the polyimide film may have a glass transition temperature of about 370° C. or higher. Within this range, the polyimide film can have good thermal properties and thus can avoid, for example, significant dimensional changes at high temperature. For example, the polyimide film may have a glass transition temperature of about 370° C. to about 420° C. (for example, about 370° C., about 380° C., about 390° C., about 400° C., about 410° C., or about 420° C.), for another example, about 380° C. or higher, for a further example, about 380° C. to about 420° C., for yet another example, about 385° C. or higher, for yet another example, about 390° C. to about 420° C., for yet another example, about 390° C. to about 410° C., without being limited thereto.

In one embodiment, the polyimide film may have a coefficient of thermal expansion of 8 ppm/° C. or less, as calculated by averaging the values of coefficient of thermal expansion in the MD and TD. Within this range, it is possible to reduce dimensional changes in the MD of the polyimide film, thereby reducing the cumulative dimensional change of a COF circuit during a COF bonding process. For example, the polyimide film may have a coefficient of thermal expansion of about 2 ppm/° C. to about 8 ppm/° C. (for example, about 2 ppm/° C., about 2.5 ppm/° C., about 3 ppm/° C., about 3.5 ppm)/° C., about 4 ppm/° C., about 4.5 ppm/° C., about 5 ppm/° C., about 5.5 ppm/° C., about 6 ppm/° C., about 6.5 ppm/° C., about 7 ppm/° C., about 7.5 ppm/° C., or about 8 ppm/° C.), for another example, about 2 ppm/° C. to about 6 ppm/° C., and for a further example, about 2 ppm/° C. to about 4 ppm/° C., as calculated by averaging the values of coefficient of thermal expansion in the MD and TD, without being limited thereto.

In one embodiment, the polyimide film may have a thickness of about 25 μm to about 50 μm (for example, about 25 μm, about 30 μm, about 35 μm, about 40 μm, about 45 μm, or about 50 μm). Within this range, the polyimide film can exhibit low spring back properties (that is, low stiffness). For example, the polyimide film may have a thickness of about 25 μm to about 40 μm, for another example, about 30 μm to about 38 μm, for a further example, about 30 μm to about 35 μm, without being limited thereto.

Polyimide Film Manufacturing Method

In accordance with another aspect of the present invention, there is provided a method of manufacturing the polyimide film as set forth above. The method includes: preparing a solution of a polyamic acid by mixing a second dianhydride monomer with a diamine monomer in a solvent to form a second amic acid bond unit through reaction therebetween, followed by adding a first dianhydride monomer and a diamine monomer to form a first amic acid bond unit through reaction therebetween; and imidizing the polyamic acid, wherein the second amic acid bond unit forms a second imide bond unit having a glass transition temperature of less than 400° C. through imidization, the first amic acid bond unit forms a first imide bond unit having a glass transition temperature of 400° C. or higher through imidization, and the polyimide film includes about 39 mol % to about 90 mol % of the first imide bond unit. Since the first dianhydride monomer, the second dianhydride monomer, the diamine monomers, the first imide bond unit, and the second imide bond unit are as described above, detailed description thereof will be omitted.

First, the polyamic acid solution may be prepared by mixing the second dianhydride monomer with the diamine monomer in the solvent, followed by reaction to form the second amic acid bond unit, and adding the first dianhydride monomer and the diamine monomer, followed by reaction to form the first amic acid bond unit. Forming the second amic acid bond unit before forming the first amic acid bond unit can facilitate control over the molecular structure of the polyamic acid while facilitating achievement of desired thermal properties of a final polyimide film.

The solvent may include any solvent that can dissolve the polyamic acid, without limitation. For example, the solvent may include an aprotic polar organic solvent. Examples of the aprotic polar solvent may include amide solvents, such as N,N'-dimethylformamide (DMF) and N,N'-dimethylacetamide (DMAC), phenolic solvents, such as p-chlorophenol and o-chlorophenol, N-methyl-pyrrolidone (NMP), γ-butyrolactone (GBL), and diglyme. These may be used alone or as a mixture thereof. As needed, an auxiliary solvent, such as toluene, tetrahydrofuran, acetone, methyl ethyl ketone, methanol, ethanol, and water, may be further used to adjust solubility of the polyamic acid. In one embodiment, the solvent may be an amide solvent, for example, N,N'-dimethylformamide or N,N'-dimethylacetamide.

In one embodiment, the total number of moles of the first dianhydride monomer and the second dianhydride monomer is substantially equal to the total number of moles of the diamine monomers. For example, a ratio of the total number of moles of the first dianhydride monomer and the second dianhydride monomer to the total number of moles of the diamine monomers ranges from about 1:0.95 to about 0.95:1, for another example, from about 1:0.96 to about 0.96:1, for a further example, from about 1:0.97 to about 0.97:1, without being limited thereto.

Reaction between the aforementioned monomers may be performed, for example, at a temperature of about 0° C. to about 80° C. for about 10 minutes to about 30 hours. In addition, control over reaction between the aforementioned monomers may be achieved by adding a small amount of a terminal encapsulant before performing the reaction, without being limited thereto.

In one embodiment, the polyamic acid may have a weight average molecular weight of about 50,000 g/mol to about 500,000 g/mol (for example, about 50,000 g/mol, about 100,000 g/mol, about 150,000 g/mol, about 200,000 g/mol, about 250,000 g/mol, about 300,000 g/mol, about 350,000 g/mol, about 400,000 g/mol, about 450,000 g/mol, or about 500,000 g/mol). Within this range, the polyimide film can have good mechanical properties. Here, the weight average molecular weight may be determined by polystyrene conversion using gel permeation chromatography (GPC). For example, the polyamic acid may have a weight average molecular weight of about 100,000 g/mol to about 400,000 g/mol, for example, about 150,000 g/mol to about 300,000 g/mol, without being limited thereto.

In one embodiment, the polyamic acid may have a viscosity of about 10,000 cP to about 300,000 cP (for example, about 10,000 cP, about 50,000 cP, about 100,000 cP, about 150,000 cP, about 200,000 cP, about 250,000 cP, or about 300,000 cP). Within this range, the polyamic acid can be stably formed into a film. Here, the viscosity may be measured under conditions of a temperature of 25° C. and a shear rate of 1 sec-1 using a rheometer (RS600, HAAKE Technik Co.) by a parallel plate method, without being limited thereto. For example, the polyamic acid may have a viscosity of about 30,000 cP to about 250,000 cP, for another example, about 50,000 cP to about 200,000 cP, without being limited thereto.

In one embodiment, the polyamic acid solution may have a solid content of about 5 wt % to about 15 wt % (for example, about 5 wt %, about 6 wt %, about 7 wt %, about 8 wt %, about 9 wt %, about 10 wt %, about 11 wt %, about 12 wt %, about 13 wt %, about 14 wt %, or about 15 wt %, for another example, about 7 wt % to about 13 wt %), without being limited thereto. Within this range, the polyamic acid can have high storage stability.

In one embodiment, an additive may be added in preparation of the polyamic acid to improve various properties of the polyimide film, such as slidability, thermal conductivity, electrical conductivity, corona resistance, and loop hardness. The additive may include, for example, fillers. Examples of the fillers may include silica, titanium oxide, alumina, silicon nitride, boron nitride, calcium hydrogen phosphate, calcium phosphate, and mica, without being limited thereto. The additive may be added in any suitable amount without affecting the effects provided by the present invention.

Then, the polyamic acid may be imidized.

A dehydrating agent and an imidizing agent may be added to the polyamic acid to imidize the polyamic acid. The dehydrating agent may include any dehydrating agent that can promote cyclization through dehydration of the polyamic acid. The dehydrating agent may include, for example, acetic anhydride. The imidizing agent may include any imidizing agent that can promote cyclization of the polyamic acid. The imidizing agent may include, for example, tertiary amines, such as quinoline, isoquinoline, B-picoline, and pyridine. Although the amounts of the dehydrating agent and the imidizing agent are not particularly restricted, the dehydrating agent may be added in an amount of, for example, about 3.5 mol to about 6.0 mol (for example, about 3.5 mol, about 4.0 mol, about 4.5 mol, about 5.0 mol, about 5.5 mol, or about 6.0 mol) per mol of an amic acid group of the polyamic acid and the imidizing agent may be added in an amount of, for example, 0.7 mol to about 1.2 mol (for example, about 0.7 mol, about 0.8 mol, about 0.9 mol, about 1.0 mol, about 1.1 mol, or about 1.2 mol) per mol of the amic acid group of the polyamic acid.

In one embodiment, imidizing the polyamic acid may include: preparing a polyimide film composition by mixing the polyamic acid solution with the dehydrating agent and the imidizing agent; and forming the composition into a film. Forming the composition into the film may include: preparing a gel film by applying the polyimide film composition in film form to a substrate and drying the composition at a temperature of about 30° C. to about 200° C. for about 15 seconds to about 30 minutes; and performing heat treatment of the gel film with the substrate removed therefrom at a temperature of about 200° C. to about 500° C. for about 15 seconds to about 30 minutes, without being limited thereto.

A polyimide film manufactured by the method set forth above has good thermal properties and thus can have high stability when processed at high temperature.

Flexible Metal Foil-Clad Laminate

In accordance with a further aspect, there is provided a flexible metal foil-clad laminate including the polyimide film set forth above. The flexible metal foil-clad laminate may have a structure in which a metal foil is formed on one or both surfaces of the polyimide film.

Thicknesses of the polyimide film and the metal foil included in the flexible metal foil-clad laminate are not particularly restricted. For example, the polyimide film may have a thickness of about 25 μm to about 50 μm (for example, about 25 µm to about 40 µm), and the metal foil may have a thickness of about 30 µm to about 38 µm (for example, about 30 µm to about 35 µm).

The flexible metal foil-clad laminate may be fabricated by any method commonly used in the art. For example, the flexible metal foil-clad laminate may be fabricated by (i) a casting method in which a polyamic acid, which is a precursor of polyimide, is cast onto or applied to a metal foil, followed by imidization, (ii) a metallization method in which a metal layer is directly deposited over a polyimide film by sputtering, or (iii) a lamination method in which a polyimide film is bonded to a metal foil by heat and pressure.

The flexible metal foil-clad laminate including the polyimide film set forth above can prevent the metal foil from being separated from the polyimide film when processed at high temperature since the polyimide film has a high glass transition temperature.

Next, the present invention will be described in more detail with reference to examples. However, it should be noted that these examples are provided for illustration only and should not be construed in any way as limiting the invention.

EXAMPLE

Example 1

With 406.7 g of dimethylformamide (DMF) placed in a reactor, 0.025 mol (7.29 g) of 3,3',4,4'-biphenyltetracarboxylic dianhydride (BPDA) as a second dianhydride monomer and 0.223 mol (24.11 g) of p-phenylenediamine (PPD) as a diamine monomer were added, followed by reaction at 25° C. for 1 hour. Then, 0.218 mol (47.56 g) of pyromellitic dianhydride (PMDA) as a first dianhydride monomer and 0.025 mol (4.96 g) of 4,4'-oxydianiline (ODA) as a diamine monomer were introduced into the reactor, followed by reaction at 30° C. for 1 hour, thereby preparing a polyamic acid solution.

Then, per mol of an amic acid group of the polyamic acid, 3.5 mol of acetic anhydride as a dehydrating agent and 1.1 mol of isoquinoline (IQ) as an imidization catalyst were added to the prepared polyamic acid solution, thereby obtaining a polyimide film composition.

The prepared polyimide film composition was cast to a thickness of 300 µm on an SUS plate (100SA, Sandvik) using a doctor blade, followed by drying at 100° C. for 5 minutes, thereby preparing a gel film. Then, the gel film was separated from the SUS plate, followed by heat treatment at 200° C. for 5 minutes and at 400° C. for 5 minutes, thereby manufacturing a polyimide film having a thickness of 35 µm.

Examples 2 to 6 and Comparative Examples 1 and 2

Polyimide films were manufactured in the same manner as in Example 1 except that the amounts of BPDA, PPD, PMDA, and ODA were changed as listed in Table 1.

Evaluation 1: Measurement of Glass Transition Temperature

Using a thermomechanical analyzer (Q800, TA Instruments), each of the polyimide films manufactured in Examples and Comparative Examples was cut to a size of 4 mm×20 mm (width>length) to prepare a specimen, which in turn was heated from room temperature to 550° C. at a rate of 5° C./min under a nitrogen atmosphere, followed by measurement of glass transition temperature. Results are shown in Table 1. Here, the glass transition temperature was determined by a maximum peak of tan δ calculated according to the ratio of storage modulus and loss modulus.

Evaluation 2: Measurement of Coefficient of Thermal Expansion (CTE)

Using a thermomechanical analyzer (Q800, TA Instruments), each of the polyimide films manufactured in Examples and Comparative Examples was cut to a size of 2 mm×10 mm (width×length) to prepare a specimen, which in turn was heated from room temperature to 480° C. at a rate of 10° C./min and was cooled at a rate of 10° C./min under a load of 0.05 N in a nitrogen atmosphere, followed by determination of coefficient of thermal expansion by measuring the slope in the range of 50° C. and 400° C. on a CTE curve plotted on the specimen. Results are shown in Table 1.

TABLE 1

| | BPDA (mol) | PPD (mol) | PMDA (mol) | ODA (mol) | First imide bond unit (mol %) | Glass transition temperature (° C.) | Coefficient of thermal expansion (Average of coefficients of thermal expansion in MD and TD) (ppm/° C.) |
|---|---|---|---|---|---|---|---|
| Example 1 | 0.025 | 0.223 | 0.218 | 0.025 | 89.8 | 415 | 3.2 |
| Example 2 | 0.134 | 0.201 | 0.088 | 0.022 | 39.8 | 374 | 5.7 |
| Example 3 | 0.048 | 0.218 | 0.190 | 0.024 | 80 | 401 | 3.0 |
| Example 4 | 0.071 | 0.214 | 0.166 | 0.024 | 70.1 | 393 | 3.1 |
| Example 5 | 0.093 | 0.209 | 0.138 | 0.023 | 59.8 | 389 | 3.6 |
| Example 6 | 0.114 | 0.205 | 0.113 | 0.023 | 49.9 | 386 | 4.5 |
| Comparative Example 1 | — | 0.228 | 0.248 | 0.025 | 100 | — | — |
| Comparative Example 2 | 0.153 | 0.197 | 0.065 | 0.022 | 30.0 | 362 | 5.1 |

As can be seen from Table 1, all of the polyimide films of Examples 1 to 6, in which the amount of the first imide bond unit fell within the range according to the present invention, had a high glass transition temperature and a low coefficient of thermal expansion.

Conversely, the polyimide film of Comparative Example 1, in which the amount of the first imide bond unit exceeded the range according to the present invention, was excessively brittle and cracked during manufacture thereof (that is, it was impossible to obtain an intact polyimide film according to Comparative Example 1). In addition, the polyimide film of Comparative Example 2, in which the amount of the first imide bond unit was less than the range according to the present invention, had a low glass transition temperature.

Although some embodiments have been described herein, it should be understood that various modifications, changes, alterations, and equivalent embodiments can be made by those skilled in the art without departing from the spirit and scope of the invention.

What is claimed is:

1. A polyimide film comprising:
   a first imide bond unit having a glass transition temperature of 400° C. or higher; and
   a second imide bond unit having a glass transition temperature of less than 400° C.,
   wherein the first imide bond unit is derived from coupling between a first dianhydride monomer and a diamine monomer and the second imide bond unit is derived from coupling between a second dianhydride monomer and a diamine monomer,
   wherein the first dianhydride monomer of the first imide bond unit comprises pyromellitic dianhydride (PMDA),
   wherein the diamine monomer of the first imide bond unit comprises 4,4'-oxydianiline (ODA),
   wherein the first imide bond unit is present in an amount of about 39 mol % to about 90 mol % in the polyimide film;
   wherein the polyimide film has a glass transition temperature of 374° C. or higher and 415° C. or lower,
   wherein the polyimide film has a coefficient of thermal expansion of 3.0 ppm/° C. or more and 5.7 ppm/° C. or less, as calculated averaging coefficients of thermal expansion in a machine direction (MD) and in a transverse direction (TD).

2. The polyimide film according to claim 1, wherein the second dianhydride monomer comprises 3,3',4,4'-biphenyltetracarboxylic dianhydride (BPDA), 3,3',4,4'-benzophenonetetracarboxylic dianhydride (BTDA), oxydiphthalic dianhydride (ODPA), or a combination thereof.

3. The polyimide film according to claim 1, wherein the diamine monomer of the first imide bond unit further comprises p-phenylenediamine (PPD), m-tolidine, or a combination thereof,
   wherein the diamine monomer of the second imide bond unit comprises each comprising p-phenylenediamine (PPD), 4,4'-oxydianiline (ODA), m-tolidine, or a combination thereof.

4. The polyimide film according to claim 1, wherein the second imide bond unit has a glass transition temperature of about 300° C. to less than 400° C.

* * * * *